Jan. 17, 1956  G. FAILLA  2,731,568
RADIATION DETECTION DEVICE
Filed Aug. 14, 1951  2 Sheets-Sheet 1

INVENTOR.
GIAOCCHINO FAILLA
BY
Roland A. Anderson
ATTORNEY

Jan. 17, 1956    G. FAILLA    2,731,568
RADIATION DETECTION DEVICE
Filed Aug. 14, 1951    2 Sheets-Sheet 2

INVENTOR.
GIAOCCHINO FAILLA
BY
Roland M. Andersen
ATTORNEY

United States Patent Office 2,731,568
Patented Jan. 17, 1956

2,731,568

RADIATION DETECTION DEVICE

Gioacchino Failla, New York, N. Y., assignor to the United States of America as represented by the United States Atomic Energy Commission Application August 14, 1951, Serial No. 241,778

8 Claims. (Cl. 250—83.3)

The present invention relates to an apparatus for detecting the presence and relative intensity of ionizing radiation.

There are numerous devices which have been designed for the detection of ionizing radiation. For the most part these devices are designed for highly accurate radiation measurement and are perforce complicated, expensive and unwieldly. The present invention is directed toward a new type of device which although sacrificing of the accuracy of the more elaborate detection apparatus is capable of being manufactured in very compact form at relatively low cost. The present device has particular utility in providing a gross indication of the presence of ionizing radiation in quantities which are dangerous or harmful to the observer. By suitable adjustment of the component parts, the apparatus may also be transformed into a more accurate detector comparable with the accuracy of the more cumbersome and conventional apparatus. The present apparatus has particular advantage for "field usage," as for example, for employment under conditions wherein the device is subjected to relatively rough treatment, or handled by comparatively unskilled persons, or used under varied weather conditions or the like. It also can be employed when no power supply or sensitive charge detecting or quantitative measuring auxiliary apparatus is available since the present apparatus will function continuously without the aid of any auxiliary apparatus to give a continual reading of the presence or absence of dangerous amounts of ionizing radiation.

It is accordingly an object of the present invention to provide a compact apparatus capable of giving a gross indication of the presence of ionizing radiation in harmful quantities.

It is another object of the present invention to provide a radiation detection device which is capable of operation within a self-contained sealed container and without the aid of auxiliary voltage generating or detecting apparatus.

It is a further object of the present invention to provide a radiation detection device capable of adjustment of sensitivity over a relatively wide range.

Other objects and advantages of the invention will be in part obvious and in part pointed out hereinafter.

In one of its broader aspects the objects of the present invention may be achieved by providing a device for indicating the presence of ionizing radiation which essentially comprises a sealed container, containing a dielectric material, an ionizable gas, and at least one movable element within said container; the element being adapted to separate triboelectric charge by relative motion of said element and said dielectric, and a means movable by a triboelectric charge against an independent restoring force for indicating the charge developed by the relative motion of said movable element in said container. As will be apparent, the means movable by said charge separated by said element may conveniently take the form of a second such element influenced by the force of gravity.

In describing some of the embodiments of the present invention reference will be made to the accompanying drawings wherein.

Figure 1:
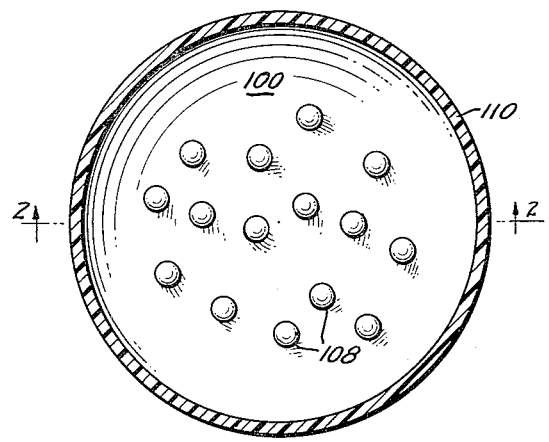
Figure 1 is a horizontal sectional view of the interior of a radiation detection device containing a number of spherical elements shown in the charged state mutually repelling each other on a concave surface, the view being taken along line 1—1 of Figure 2.
Figure 2:
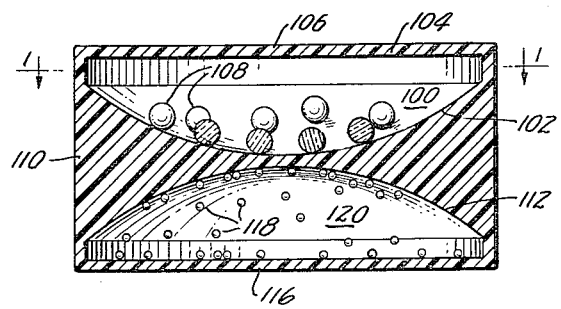
Figure 2 is a vertical section taken on a line 2—2 of Figure 1 showing the concave surfaces of the two chambers of the detection device as well as the movable elements of different sizes in the respective chambers.

Referring now to Figures 1 and 2, one form of the apparatus comprises an invertible container 110 made preferably of a dielectric material and having formed therein two chambers 100 and 120. These two chambers each have one concave surface, 102 and 112 respectively and are formed as depressions in the generally cylindrical container 110. The chambers are defined at their outer surfaces by flat surfaced windows 106 and 116, here shown as being part of a transparent dielectric, and at their inner surfaces by the concave depressions 102 and 112. Within each of the chambers a number of elements, preferably also of a non-conducting material, are sealed so that relative motion of the container and elements results in the separation of a triboelectric charge. Thus, for example in the chamber 100 a number of spheres 108 of glass, amber or other non-conducting material, each having approximately the same weight and size, rest upon the concave surface 102 which forms one boundary of the chamber 100. A number of spheres 118 of smaller diameter are enclosed within the chamber 120. In the course of fabricating the apparatus it is preferable to ensure that the gas enclosed within the chambers is dry when the chambers are sealed. The operation of the apparatus depends on the separation of a triboelectric charge by the motion of the spheres relative to the container 110. Such a charge may exist on the spheres or on the chamber surface or both. When the spheres are uncharged gravity causes them to gather at the lowest point of the concave surface 102 where they rest in contact with one another. If the apparatus is shaken so that the elements are caused to move about within the chamber in contact with the walls thereof a triboelectric charge is separated which causes the spherical elements to be displaced from each other about the surface of the chambers. The larger spheres 108 in the chamber 100, when permitted to rest on the concave surface 102, are mutually repelled by the triboelectric charge as illustrated in the Figures 1 and 2.

The principal indication upon which an operator relies in employing this device as a radiation detection meter, is the separation or the failure of separation of the elements when and after the device is shaken. Thus, if a user is exposed to a field of radiation of higher intensity than that which the large sphere portion of the device is set to indicate, he will be unable to cause triboelectric separation of the larger spheres by shaking the device. This serves to give the user an instantaneous indication of exposure to radiation above a certain threshold danger level. The intensity range of the radiation may then be roughly approximated by inverting the apparatus and by shaking and observing the behavior of the smaller set of spheres. In general, it is more difficult to cause the electrostatic separation of larger diameter than of smaller diameter spheres and therefore the smaller diameter spheres can be made to separate by shaking in a stronger radiation field than the larger spheres. If the user finds that he is unable to charge the large diameter spheres 108 because of the action of the radiation to which the apparatus is exposed, he may invert the apparatus and continue shaking to cause a relative motion of the smaller spheres 118 within the chamber 120. In this manner, he may determine if the intensity of the field of radiation to which the apparatus is exposed is above a second and more critical danger level. The two sets of spheres of different diameters may be useful for example to indicate the presence of a predetermined dosage rate of radiation when the large diameter spheres fail to charge, and of a greater radiation dosage rate when the smaller diameter spheres 118 fail to charge. The selection of spheres of different diameters and the employment of a larger number of chambers (as will be discussed below with reference to Figure 3) with suitable adjustment of the sensitivity of the apparatus, permits the radiation intensity level to be determined within relatively close limits simply by causing frictional motion of the movable elements in the container. It is thus apparent that the plurality of spheres in this embodiment mutually operate as both the triboelectric charge developing means and the charge indicating means.

In one satisfactory form of apparatus, such as that indicated in Figure 1, spheres of about 3 millimeters diameter were enclosed within a chamber having a concave surface, the radius of curvature of the surface being about one inch. By shaking the container so as to impart a rapid motion of the spheres relative to the container a triboelectric charge was developed in the apparatus. This was apparent from the mutual displacement of the spheres by about 3 millimeters. The device failed to charge when shaken in a radiation field of about 30 roentgens per hour.

Figure 3:
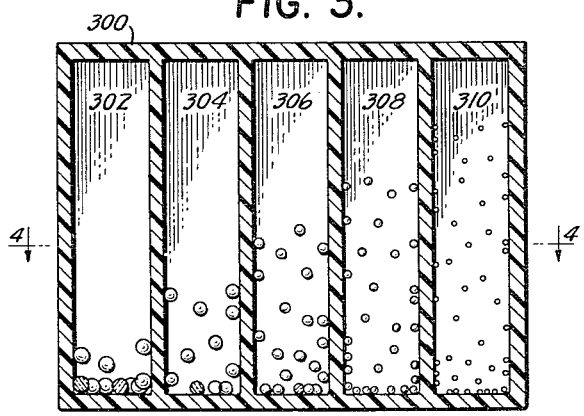
Figure 3 is a vertical section of a second form of the apparatus for carrying out the invention showing five chambers having movable elements respectively of five different sizes, the section being taken along line 3—3 of Figure 4.
Figure 4:
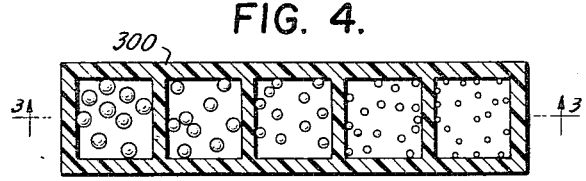
Figure 4 is a horizontal section taken on a line 4—4 of Figure 3.

A second form of apparatus is disclosed in Figures 3 and 4. In this modification a container 300 encloses five separate chambers 302, 304, 306, 308 and 310 constructed of a dielectric material which preferably is transparent, although non-conducting separate windows may be used if desired. A set of uniform diameter spherical elements is sealed in each chamber but no two sets of elements have the same diameter. The shaking of the apparatus causes a triboelectric charge to be separated in the chambers and this causes the elements to cling to the vertical walls of the respective chambers against the force of gravity. As is indicated in Figure 3, the smaller elements such as those in chamber 308 come to rest at a higher level than the larger diameter elements such as those in chamber 304 due to the interplay of forces of repulsion and attraction resulting from the separation of triboelectric charges. This is an indication both of the ease with which the smaller diameter elements are separated by the development of triboelectric charge and the difficulty of removing them from the walls due to the dispersal of the charge in a field of ionizing radiation.

In the operation of the apparatus illustrated in Figures 3 and 4 an operator who wishes to test whether he is in a field of ionizing radiation shakes the device so as to bring the spherical elements into moving contact with the walls of the chambers. He is able to determine the level of the radiation intensity to which he is exposed by observing the level at which the elements in the chambers are retained on the walls when the shaking is stopped. Thus, for example if he observes that the larger elements in the two chambers on the left do not cling to the vertical walls of the chambers but that the elements in the three chambers of the right do separate and cling to the vertical walls of these chambers, he is made aware that radiation intensity to which he is exposed is above that which will prevent retention of elements on the walls of chamber 304 but below that which will prevent retention of the elements on the walls of chamber 306. By prior calibration the observation of the resulting location of the elements in the respective chambers will tell the observer the level of radiation. A useful range of diameters for such elements is from about 0.1 to about 1.0 millimeter. As an alternative to the incorporation of such different diameter elements, elements of different densities may be incorporated. These have the same utility in indicating radiation intensity because the heavier elements are more difficult to suspend against the force of gravity by electrical attraction onto the walls of the chambers. The heavier elements are easier to dislodge under the influence of a radiation field, but other factors, also, influence the response.

Figure 5:
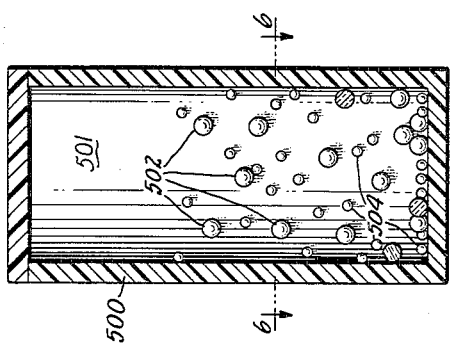
Figures 5 and 6 are vertical and horizontal sections respectively of a third form of apparatus showing a single cylindrical chamber device having sets of pellets of different sizes, the section of Figure 6 being taken along line 6—6 of Figure 5.
Figure 6:
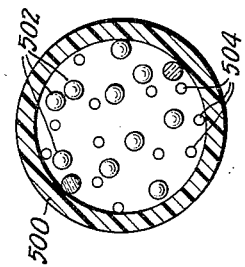

Turning now to Figures 5 and 6 another form of the apparatus, containing two sets of movable chargeable elements within the same container, is shown. The apparatus preferably consists of a plastic dielectric, transparent housing 500 enclosing a chamber 501. The housing may have a generally cylindrical shape and may be formed by sealing a top plate 503 at its periphery on to the upper tubular wall of the main portion of the housing 500. In this embodiment of the invention two sets of spherical elements, a larger set 502 and a smaller set 504 are sealed into the chamber 501. By shaking the device a motion is imparted to the elements 502 and 504 relative to the container which causes them to move about in frictional contact with the inner surface of the container. Such motion causes the separation of a triboelectric charge within the container such that the elements are mutually repelled and displaced from each other, are suspended against the force of gravity, and tend to adhere to the internal vertical walls of the container 500. When such a device is shaken in a field of ionizing radiation of sufficient intensity the triboelectric charge will not be developed. Thus, the displacement of the chargeable elements 502 about the internal walls of the container or their failure to be displaced serves as an indication of the strength of the field in which the shaking motion is imparted to the device. As a general rule, it is found that for elements of the same material the smaller diameter elements are able to cling to the vertical walls of the container more easily than the heavy elements (as pointed out with respect to Figures 3 and 4) and it will be therefore be noted that the smaller elements will tend to achieve a higher position on the walls of the container 500 as a result of the shaking.

Figure 7:
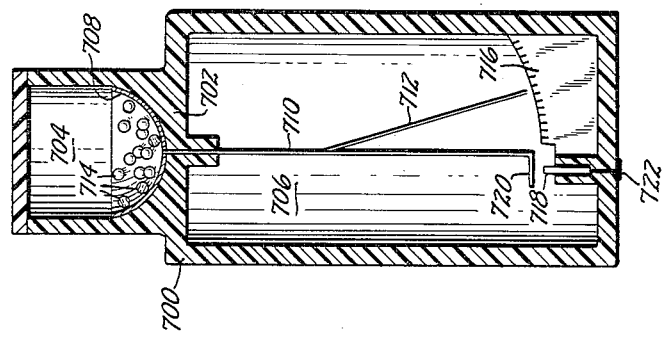
Figure 7 is a vertical section of still another form of apparatus suitable for carrying out the invention and wherein a frictional charging chamber of cylindrical or other suitable configuration is electrically connected to a filament charge detecting chamber spaced from the charging chamber.

Referring now to Figure 7 still another form of the apparatus is illustrated. This apparatus comprises generally a plastic dielectric, transparent housing 700 which is divided internally by the plastic wall 702 into an upper and lower chamber, 704 and 706 respectivley. The upper chamber 704 is the charging portion of the apparatus. It consists generally of a cup shape metal element 708 lining the lower portion of the chamber and a number of movable spherical elements 714 sealed within the chamber. A motion is imparted to these elements to charge the device preferably by moving the device laterally in a generally circular motion. This motion causes the separation of a triboelectric charge because the elements move in frictional contact with the upper plastic portion of the chamber 704. When the motion is stopped the charged elements fall to the metal cup portion 708 of the chamber. They may remain separated by mutual repulsion on the curved inner surface of the cup 708 but in any case the charge developed by their motion is retained in the device. The presence of the charge is indicated by the movement of the electrometer fiber 712 in chamber 706. This fiber moves pivotally from the conductive rod 710 which is sealed in the wall 702 in electrical contact with cup 708. The rod 710 acts as one plate of a condenser in the chamber 706, the other plate being formed as a conductive coating, not shown, on the internal vertical and lower surface of the chamber 706. An electrically conductive substance such as Aquadag or evaporated aluminum is preferably used for forming this electrode coating The development of a charge on rod 710 by the lateral shaking of the device 20 results in the establishment of an electric field in chamber 706 between the condenser plates or electrodes. Ion pairs formed in this field by radiation penetrating the chamber are separated and attracted to the electrodes. Thus the effect of radiation penetrating the device is the neutralization of a charge developed therein or the prevention of its development. A sufficient portion of the transparent plastic wall of the chamber 706 is left free of the conducting substance to permit viewing the position of the filament 712 with respect to a scale 716. In order to discharge the device a grounding key 718 is provided at the lower portion of the chamber 706. This key is electrically connected with the chamber exterior through a conducting element 722 sealed through the wall 700 of the chamber. An abutment 720 is provided at the lower end of rod 710 to insure that the key will not be completely removed from its position of support in the lower wall of the chamber when the device is inverted, but will fall into electrical contact with rod 710. In using the device it is charged by holding it in a vertical position and shaking it laterally, preferably with a circular lateral motion, to cause the elements 714 to move in the chamber 704 in contact with the internal walls thereof. As the elements move about the walls a triboelectric charge is separated and the elements become charged. When the device is no longer shaken these elements come to rest in the cup portion 708 of the chamber 704 and cause a charge to be transmitted through the rod 710 as indicated by the movement of the filament 712 with respect to scale 716. Under normal conditions the filament 712 will remain in the charged position for an extended period of time. However when the device is shaken in a field of ionizing radiation, the movement of the filament 712 to its uncharged or rest position will occur much more rapidly after the device has been charged. The rate of movement of the filament 712 is greater for more intense fields of radiation and thus may be used as an indication of the radiation intensity. For very intense fields the device will fail to charge at all when shaken. The device may be discharged and the procedure repeated simply by inverting the apparatus and proceeding with the shaking as hereinabove described.

Figure 8:
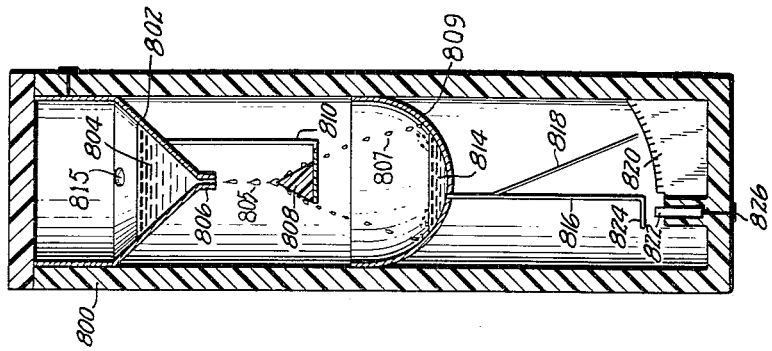
Figure 8 is a vertical section of still another form of apparatus adapted to employ a dropping liquid as the element to separate the charge and which likewise has a separate charge detection chamber.

Referring now to Figure 8 still another form of the apparatus consists of a plastic transparent housing 800 enclosing an upper liquid charging portion and a lower ionization portion electrically insulated from each other. The upper portion consists of a funnel element 802 having a relatively narrow bore outlet 806. A liquid 804 in the funnel falls by gravity to form individual droplets 805 as it leaves the outlet and these droplets impinge on an inverted conical element 808 of dielectric material supported by a rod 810 beneath the outlet 806. The drops 805, serving the purpose of the spheres or movable elements in the preceding modifications, become charged by their contact with the conical element 808 and form droplets 807. These charged droplets fall to and are caught by a cup-shaped element 809 which is supported and sealed about midway in the container 800 against the internal vertical walls of the generally cylindrical container. This confines the liquid into the upper portion of the container. The droplets collect in the cup 809 as a liquid deposit 814. In order to return the liquid to the upper funnel member 802 the apparatus may be inverted to enable the liquid to flow through the port 815 into the chamber formed within the funnel 802. In has been discovered that it is possible to develop a charge on a well insulated conducting element such as 809 by permitting a liquid such as mercury to flow in droplets from an upper element into the element to be charged. It should be noted that if the mercury comes out of the outlet 806 in the form of a stream, it is nevertheless broken into droplets upon impinging on conical element 808. Such an accumulation of charge on the cup 809 is indicated by the displacement of the filament 818 from the rod 816. This rod is attached into and extends downward from lower portion of cup 809. A scale 820 is provided to measure the extent of the movement of the filament 818. The internal horizontal and the lower vertical surfaces of the chamber formed beneath the cup 809 are made electrically conducting by applying thereto a conducting substance such as Aquadag or evaporated aluminum, suitable portions of the transparent housing of the lower chamber being left uncoated to provide visual inspection of scale 820. The portion of the internal vertical wall surface proximate to the cup 809 is also left free of any conducting substance so that the cup 809 is maintained in insulated relation within the container 800. Once the rod 816 has become charged due to the development of a charge on a cup 809 this lower portion of the apparatus acts as an ionization chamber. The rod 816 and its electrically connected portions may become discharged by a separation of ion pairs in the gas ambient to this rod by ionizing radiation which penetrates the container 800. The operation of this portion of the device as an ionization chamber is similar to that described with respect to chamber 706 of Figure 7. The discharge of the rod 816 and its electrically connected portions may also be brought about by inverting the apparatus to bring the grounding key 822 into contact with the lower portion 824 of the rod 816. Electrical connection of the grounding key 822 with the container exterior is made through the conducting element 826. Thus the inversion of the apparatus serves to discharge the rod 816 and cup 809 and also serves to return the liquid 814 deposited in the cup 809 to the funnel 802. When this device is operated in a radiation field, charge accumulates in element 809 as the charged droplets fall into it. At the same time charge is carried away from it by the ions formed by the radiation in the gas within the container. The same amount of liquid in the form of droplets passing into cup 809 delivers to it essentially the same amount of charge in the time that it takes to flow through orifice 806. In the same time ionization in the gas removes a certain amount of charge from the same system, being greater the higher the intensity of the radiation. Therefore, the net charge at the end of the flow of liquid depends on the intensity of the radiation. Hence the maximum deflection of element 818 on scale 820 at the end of the running cycle is dependent on the intensity of radiation. Accordingly, the scale can be calibrated in terms of dosage rate, for instance roentgens per hour, for the maximum excursion of element 818. It is clear that after all the liquid has passed into cup 809, charge will continue to be carried away from it by the ionization and element 818 will gradually return to the discharged position. The rapidity of this motion can be used as an additional measure of the intensity of radiation, especially for low values. Obviously, if the radiation intensity is very high charge is carried away by ionization as fast as it is brought to cup 809 by the liquid droplets and the system does not charge. However, by suitable design the radiation intensity at which this will occur can be made as high as desired.

In general, with respect to the operation of the devices contemplated by the present invention the motion of a movable element in contact with surfaces hermetically sealed within the container causes the separation of a charge within this container. Ionizing radiation which penetrates the apparatus causes charged particles to be formed within the apparatus. The ions become separated under the influence of the developing charge and tend to neutralize it.

From the foregoing it is apparent that the device is capable of self-contained operation in a hermetically sealed container. Thus it is not necessary for any charging, discharging, or charge indicating or measuring devices to penetrate the sealed external container in order to render the device operative. The charge generating means as well as the charge indicating means are sealed within the container. The scope of the present invention includes the devices wherein the charge developing and charge indicating means are identical and wherein they are separate.

From the foregoing it is also apparent that the present invention provides a very compact and economic apparatus. It will be understood that the several forms of the apparatus as set out are given for illustrative purposes and that the concept of the present invention is not limited to the illustrations given.

I claim:

1. A device for indicating the presence and intensity of ionizing radiation which comprises a sealed container containing a dielectric material, an ionizable gas within said container, at least one small spherical element within said container free to move in said container in contact with the dielectric material to separate triboelectric charge and at least another such spherical element within said container being adapted to be displaced by said charge against the force of gravity.

2. A device for indicating the presence and intensity of ionizing radiation which comprises a hermetically sealed container having a plurality of chambers each containing a dielectric material, an ionizable gas within each of said chambers, a first movable element within each of said chambers, adapted to separate triboelectric charge by relative motion of said element and said dielectric material, and at least one second element in each chamber being adapted to be displaced by said charge against the force of gravity.

3. A device for indicating the presence and intensity of ionizing radiation which comprises a hermetically sealed container having a concave inner surface, and containing a dielectric material, an ionizable gas within said container, a first movable non-conducting spherical element within said container, adapted to separate triboelectric charge by relative motion of said elements in said container and at least one second element within said chamber adapted to be displaced and suspended upon said concave surface against the force of gravity.

4. A device for indicating the presence and intensity of ionizing radiation which comprises a hermetically sealed container divided by an internal separating wall into an upper and a lower chamber, said upper chamber containing a dielectric material and said lower chamber containing an ionizable gas, at least one movable element within the upper chamber adapted to separate triboelectric charge by relative motion of said element and said dielectric material, means in the lower chamber for indicating the charge developed in the upper chamber, and means for transmitting the developed charge to the indicating means.

5. A device for indicating the presence and intensity of ionizing radiation which comprises a hermetically sealed container, containing a dielectric material, an ionizable gas within said container, a liquid adapted to separate triboelectric charge by relative motion of said liquid and material and means movable by the triboelectric charge developed, against an independent restoring force, for indicating the charge developed by the relative motion of said liquid within said container.

6. A device for indicating the presence and intensity of ionizing radiation which comprises a hermetically sealed container divided by a chargeable separating wall into an upper and a lower chamber, said lower chamber containing an ionizable gas, said upper chamber being provided with a fluid dispensing funnel disposed to release fluid onto a drop producing member containing a dielectric material and positioned beneath the funnel outlet, an opening near the upper portion of said fluid dispensing funnel, and means extending from said wall into said lower chamber for indicating the charge developed on said separating wall.

7. A device for indicating the presence and intensity of ionizing radiation which comprises a sealed container containing a dielectric material, an ionizable gas within said container, a plurality of movable elements of different weights adapted to separate triboelectric charge by relative motion of said elements and said dielectric material, said elements being movable by a triboelectric charge against the force of gravity to indicate the persistence of a charge developed by said motion relative to the different weights of said elements.

8. A device for indicating the presence and intensity of ionizing radiation which comprises a sealed container containing a dielectric material, an ionizable gas within said container, a plurality of movable elements of different sizes adapted to separate triboelectric charge by relative motion of said elements and said dielectric material, said elements being movable by a triboelectric charge against the force of gravity to indicate the persistence of a charge developed by said motion relative to the different sizes of said elements.

References Cited in the file of this patent

UNITED STATES PATENTS

| | | |
|---|---|---|
| 1,501,185 | Portman | July 15, 1924 |
| 1,882,294 | Mulvey | Oct. 11, 1932 |
| 1,974,782 | Muench | Sept. 25, 1934 |
| 2,449,880 | Cox | Sept. 21, 1948 |
| 2,646,516 | Futterknecht | July 21, 1953 |
| 2,700,109 | Argabrite | Jan. 18, 1955 |

FOREIGN PATENTS

| | | |
|---|---|---|
| 169,918 | Great Britain | Oct. 13, 1921 |